United States Patent [19]
Neff

[11] Patent Number: 5,902,445
[45] Date of Patent: *May 11, 1999

[54] APPARATUS FOR BONDING WITH A MELTABLE COMPOSITION

[75] Inventor: Craig A. Neff, Golden, Colo.

[73] Assignee: AST Holding, Ltd., Golden, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/526,099

[22] Filed: Sep. 11, 1995

[51] Int. Cl.$^6$ ............................... B32B 35/00; H01S 3/10
[52] U.S. Cl. .................. 156/356; 156/359; 156/379.6; 156/379.8; 156/550; 156/578; 156/539; 198/789; 226/152
[58] Field of Search ..................................... 156/538, 539, 156/543, 544, 546, 547, 550, 578, 356, 359, 362, 379.6, 379.8, 380.9; 226/152, 179, 180, 188; 118/668, 674, 620, 641; 198/780, 781.01, 781.02, 781.03, 781.04, 783, 789, 790, 791

[56] References Cited

U.S. PATENT DOCUMENTS

| | | |
|---|---|---|
| 3,619,325 | 11/1971 | Hair et al. . |
| 4,156,626 | 5/1979 | Souder . |
| 4,337,442 | 6/1982 | Mauck . |
| 4,439,861 | 3/1984 | Bradford . |
| 4,557,787 | 12/1985 | Mansfield et al. ...................... 156/356 |
| 4,602,750 | 7/1986 | Hjortnas . |
| 4,762,578 | 8/1988 | Burgin, Jr. et al. ................. 156/356 X |
| 4,896,809 | 1/1990 | Koyanagi ................................ 226/188 |
| 4,930,901 | 6/1990 | Johnson et al. . |
| 5,110,615 | 5/1992 | Maiorca et al. ..................... 156/356 X |
| 5,356,062 | 10/1994 | Kato . |
| 5,693,177 | 12/1997 | Meltzer et al. . |

FOREIGN PATENT DOCUMENTS

WO 94/16888  8/1994  WIPO .

*Primary Examiner*—Curtis Mayes
*Attorney, Agent, or Firm*—Dickinson Wright PLLC

[57] ABSTRACT

A machine for applying a heat meltable composition includes a drive module, a light source module, and a nozzle module. The drive module attaches to the end of an elongate arm for moving the material with respect to the nozzle. The light module includes a laser for irradiating the composition as it passes through the nozzle and is applied to the material. The nozzle includes a mechanism for withdrawing the composition after flow is terminated to prevent the formation of strings in the composition. The modules are controlled by a process that provides a sequence of steps upon receipt of control signals from an operator foot pedal.

8 Claims, 5 Drawing Sheets

APPARATUS FOR BONDING WITH A MELTABLE COMPOSITION

TECHNICAL FIELD

This invention relates to the art of machines for bonding two pieces of material to each other with a heat meltable composition.

BACKGROUND ART

Pieces of fabric are typically secured together by the process of sewing, namely by passing a thread through the pieces along a line, or seam. U.S. Pat. No. 5,348,604, however, teaches the use of a heat meltable composition for bonding articles, such as two pieces of fabric. The composition is applied to the articles to be bonded by a nozzle, and a light beam, preferably from a laser, is directed into the composition as it flows through the nozzle. While this method has proven useful in the laboratory, it has not been applied to the sewing industry in general.

SUMMARY OF THE INVENTION

In accordance with the invention, an apparatus and method for its operation are provided that allow the technology of U.S. Pat. No. 5,348,604 to be used to secure two pieces of material, such as fabric together, in much the same manner as that of a sewing machine. The machine may be viewed as including three major parts mounted on a base cabinet. First, the machine includes a nozzle assembly that provides a nozzle for dispensing the bonding composition and a pump for supplying the composition to the nozzle. Second, the machine includes a light source assembly that preferably includes a laser for directing light into the composition as it passes through the nozzle. Third, the machine includes drive means for moving the material with respect to the nozzle. This drive means preferably includes an arm having a drive roller for engaging the material to be bonded and moving the material with respect to the nozzle.

The nozzle assembly includes a housing that is preferably heated to the desired temperature of the meltable composition. An opening in that housing receives a nozzle, and a portion of the flow path is formed between the opening and the nozzle. This opening also includes a movable element for reversing the flow of the composition in the nozzle when the flow is stopped to prevent "stringing" of the composition. This movable element creates an "aneurism" that quickly increases the volume of the flow path at a time when the flow is terminated, thus causing suction adequate to withdraw the composition into the nozzle by an amount just adequate to sharply terminate flow of the composition onto the material to be bonded.

The light source assembly includes a Nd:YAG laser that is mounted on the cabinet in a vertical orientation whereby its beam is aimed directly into the nozzle without requiring mirrors or other optical elements. The power supply of the laser is controlled by a microprocessor that receives inputs from a variety of sensors and from an operator foot pedal. The signal from the foot pedal controls the material drive means and determines the speed at which the material is fed past the nozzle. When the foot pedal is initially depressed, the microprocessor causes a large signal to be applied to the laser power supply, whereby, the laser is immediately pumped to its maximum power level. During this initial period, an optical shutter within the laser cavity is in a closed position. After a predetermined period of time, i.e., about 0.2 sec, the shutter is opened to allow lasing to begin and the output beam to pass through the nozzle. At the time the lasing begins, the composition is also fed into the nozzle, and the material begins movement past the nozzle to form the seam between the pieces of material. After another predetermined period of time, e.g., about 0.2 sec, the power of the laser is adjusted to the power level appropriate for the particular composition flow rate. The appropriate power level and corresponding power supply voltage are determined for the particular laser, composition, and flow rate. These values are recorded in a table, and the control system simply finds the appropriate power supply voltage from the look up table once the composition flow rate is determined in accordance with the foot pedal voltage input. Thus, the system microprocessor includes a look up table that correlates the foot pedal input voltage with the material speed, the required composition flow rate, and the required laser power.

It has been found in practice that polymer compositions form strings of the composition when the material moved away from the nozzle, even if the flow of composition has been stopped. To prevent this, the nozzle assembly of the invention is provided with a device for withdrawing the bead of composition on the outside of the nozzle when the flow of composition is stopped. This is accomplished by expanding the volume of the nozzle at the same time the flow is terminated. This creates a localized low pressure that sucks the bead of composition that is just outside the tip of the nozzle back into the nozzle, thus, preventing the formation of a string of composition.

The drive means includes an extended arm to allow a variety of sizes of material to be accommodated. The arm extends away from the cabinet and includes a coaxial drive shaft. A drive module is attached to the end of the arm in engagement with the drive shaft to provide means for driving the material with respect to the nozzle. The drive means is preferably a drive roller that frictionally engages the material to be bonded. A variety of drive modules may be employed, such as those for moving the material along the arm, transverse to the arm, etc. A second part of the drive means provides pinch rollers for pressing the material against the drive roller. The pinch rollers are preferably attached to the nozzle housing for calibrated movement vertically with respect to the nozzle to adjust the distance of the nozzle from the material.

DETAILED DESCRIPTION OF THE PREFERRED EMBODIMENT

Figure 1:
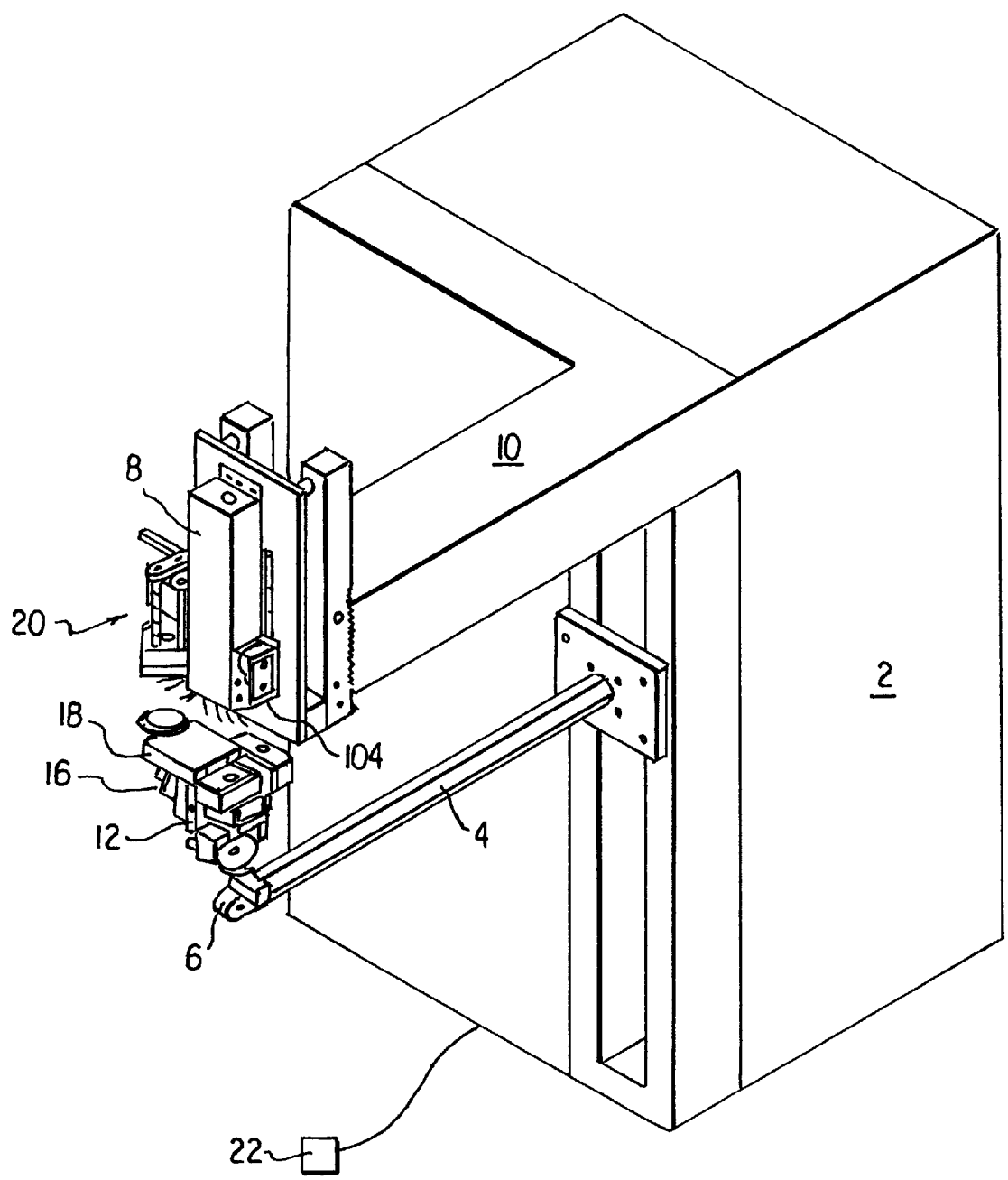
FIG. 1 is a perspective of an apparatus in accordance with the invention.

With reference to FIG. 1, an apparatus in accordance with the invention comprises a base cabinet 2 that provides a support for operational modules, as will be described further below, and houses electronic control elements, a cooling water tank, a drive motor, and other items that will become apparent below. An arm 4 extends away from the cabinet and includes an axially aligned drive shaft. A drive module 6 for controlling the movement of the material to be bonded is removably attached to the outer end of the arm 4. An upper extension 10 of the cabinet extends parallel to the arm 4 and supports a light source module 8. A nozzle housing 12 is also supported by the extension 10 such that a nozzle 14 (see FIG. 2) is held above the drive module in such a position that the composition is applied to the material as it is moved by the drive module 6.

The composition that is applied to the material is preferably a hot melt adhesive, such as any of several known polymers. The melted composition is caused to flow through the nozzle by pressure supplied by pump 16. The composition is supplied to the pump from melt chamber IS, and the composition may be supplied to the melt chamber in any of several ways. In the embodiment shown in FIG. 1, the composition is in the form of a rope (not shown) that is supplied by a rope advancing mechanism 20. The rope advancing mechanism may comprise two parts that advance along the rope for a predetermined distance and then pull the rope into the melt chamber. The parts advance along the rope by providing a mechanism that allows the rope to pass through the part in only one direction. As the upper one of the parts moves along the rope, it pushes against the lower one of the parts. Then the lower one of the parts pulls itself against the upper one, after which both parts are pulled toward the melt chamber to advance the rope into the chamber. A foot pedal 22 is provided to allow an operator to control the drive module and, hence, the advancement of the material past the nozzle. The pedal provides an electric output that is supplied to a microprocessor for coordination with other aspects of the machine, as will be explained in more detail below.

Figure 2:
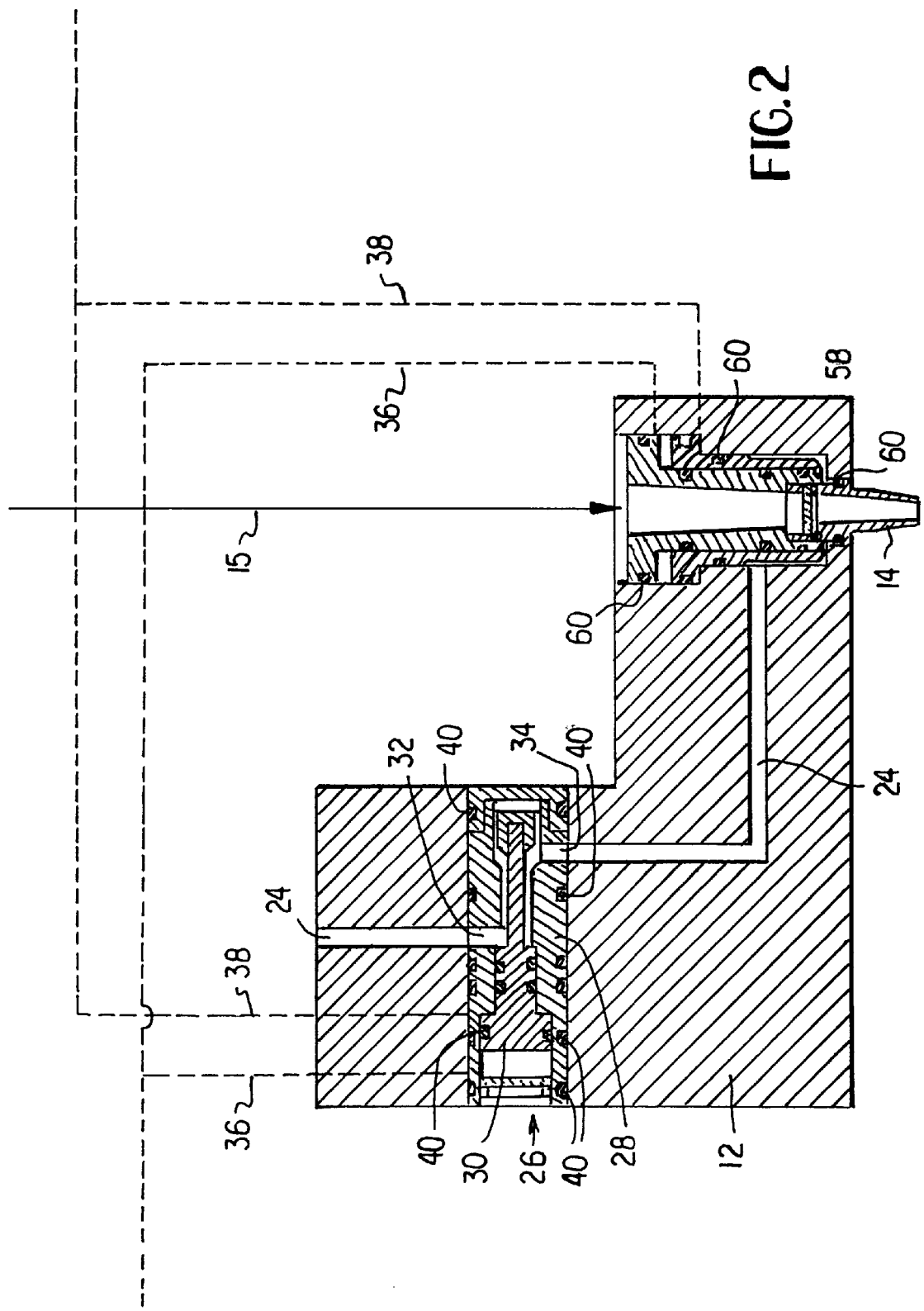
FIG. 2 is a cross section of a nozzle module in accordance with the invention.
Figure 3A:
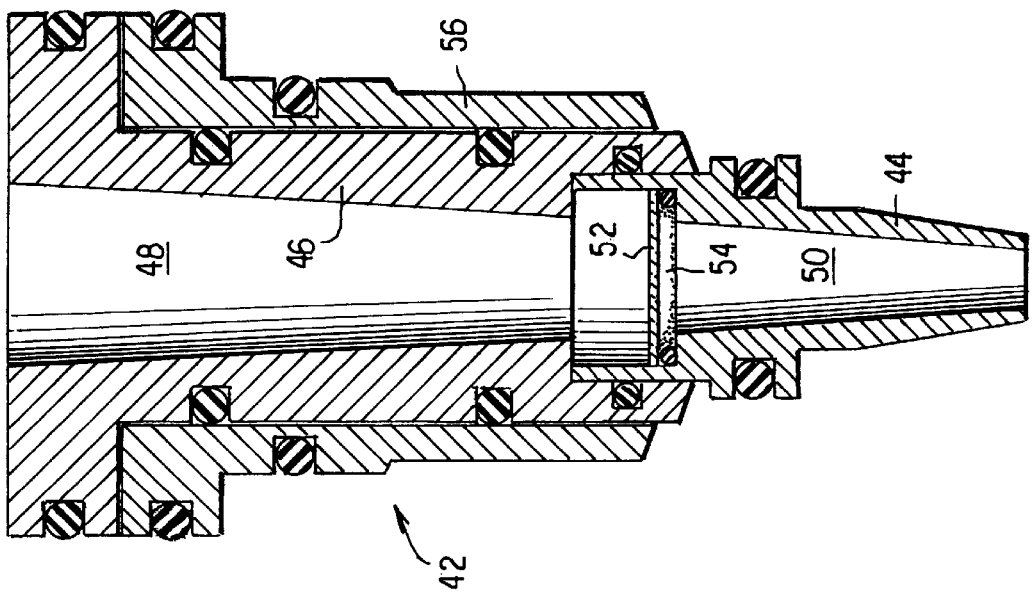
FIGS. 3a and 3b are enlarged cross sectional views of the nozzle assembly of the module shown in FIG. 2.

With reference to FIGS. 2 and 3, the preferred flow path for the machine includes a passage 24 for conveying the melted composition from the pump 16 to the nozzle 14. A pneumatically controlled valve 26 is placed in the passage 24 to control the flow of the composition to the nozzle. The valve comprises a module made up of a first part 28 that is received in a cylindrical opening in the nozzle module 12 and a movable part 30 that slides within the first part and is controlled by pneumatic pressure. The composition is supplied at an inlet 32, and the outlet 34 is controlled by the position of the movable part. FIG. 2 illustrates the position of the movable part in the open condition whereby the composition may flow through the passage 24 from the pump to the nozzle.

Air supply line 36 is connected to the valve 26 to cause the valve to move to the open position shown in FIG. 2 upon the application of pressure. In this position, the composition flows through the passage 24 to the nozzle for application to the material. A second air supply line 38 is provided to drive the movable part to the left in FIG. 1 to close the outlet 34 and terminate flow through the passage. The valve 26 also provides a safety release in that over pressure in the passage 24 will force the movable part to the open position to release the pressure by allowing flow through the nozzle. It will be appreciated that a plurality of O-rings 40 are provided in the valve.

The air lines 36 and 38 are also connected to a nozzle assembly 42 to operate a flow reversing mechanism for prevention of "strings" in the composition when the material is pulled away from the nozzle after the flow is stopped. The preferred flow reversing mechanism will be described with reference to FIGS. 3a and 3b.

The nozzle assembly 42 fits in an opening in the nozzle module 12. The assembly includes a nozzle tip 44 that is held by a nozzle base 46. The nozzle base is generally cylindrical and provides an open channel 48 for the passage of a light beam 15 from the laser 8. The nozzle tip 44 forms dispensing channel 50 for dispensing the composition onto the material. The top of the dispensing channel is closed by a window 52 that allows the laser light to enter the channel 50 to be coupled to the composition in the channel as described in my prior U.S. Pat. No. 5,348,604. An O-ring 54 seals the window to the channel. A cylindrical sleeve 56 is mounted on the base 46 for vertical movement in accordance with the air pressure in pneumatic lines 36 and 38 and in coordination with the operation of valve 26.

Figure 3B:
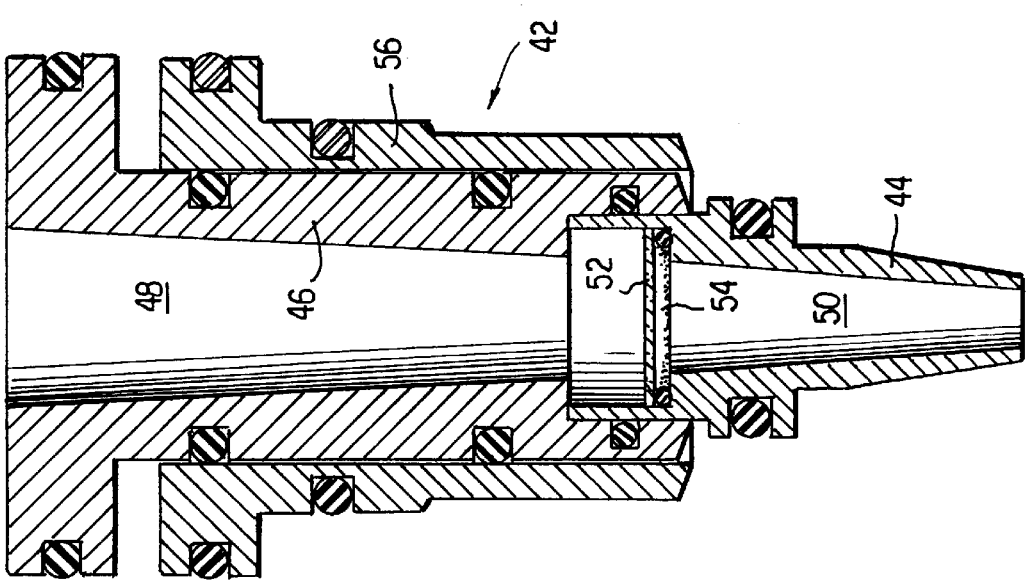

The lower part of the nozzle assembly 42 forms a chamber 58 (FIG. 2) with the opening in the nozzle module. When the valve 26 is in the open position shown in FIG. 2, the cylindrical sleeve 56 is in the lowered position shown in FIGS. 2 and 3a, and the chamber 58 is in its minimum volume condition. In this condition, the composition flows through the chamber, through holes (not shown) in the nozzle tip, and out of the dispensing channel 50. When it is desired to stop application of the composition, however, the operator releases pressure on the foot pedal 22, which causes the valve 26 to close by application of pressure in line 38. At the same time, the air in line 38 causes the sleeve 56 to move upward, as illustrated in FIG. 3b, to increase the volume in the chamber 58. This increase in the volume of chamber 58 reduces the fluid pressure in the area adjacent the dispensing channel 50 and, in turn, reverses the flow of the composition in the channel 50. Thus, the typical bit of composition that is outside the channel in the form of a meniscus is sucked back into the channel, and "strings" are prevented.

It will be appreciated that a number of O-rings 60 are provided to seal the nozzle assembly in the module 12 and to provide a seal between the cylindrical sleeve 56 and the base 46.

Figure 4:
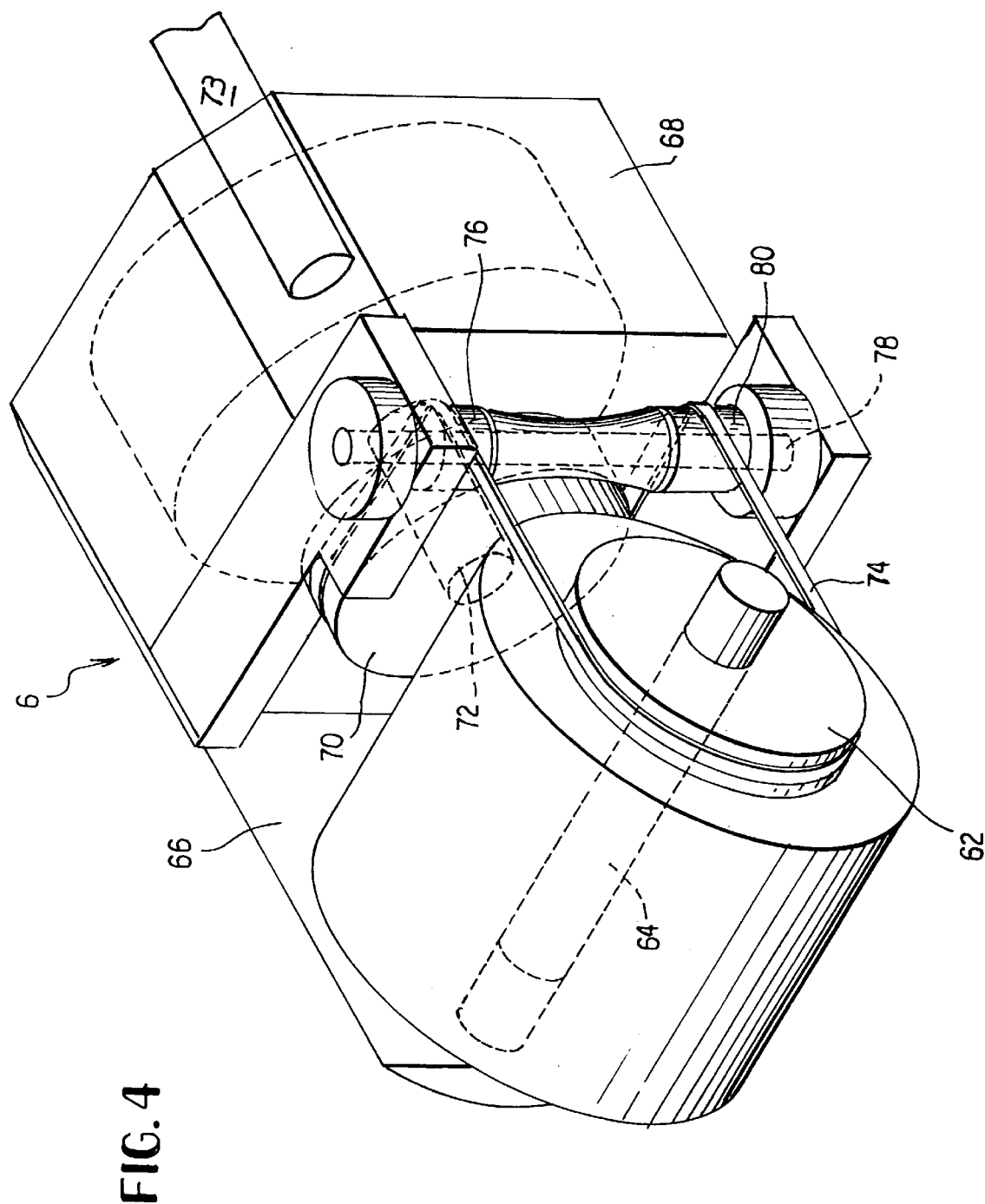
FIG. 4 is a perspective of the drive module of FIG. 1.

A preferred drive module 6 will now be described with reference to FIG. 4. The arm 4 is designed to accept a variety of drive modules, each of which is designed for a particular purpose. For example, the drive module shown in FIG. 4 is designed to engage material to be bonded and move it in the direction of the longitudinal axis of the arm 4. This would be useful, for example, in the manufacture of a cylindrical article, such as the sleeve of a garment.

The drive module 6 includes a drive roller 62 mounted for rotation on a shaft 64. The shaft 64 is carried by parallel, opposed side plates 66, only one of which is shown in FIG. 4. The side plates are attached to a module housing 68, which in turn may be attached to the end of the arm 4. A drive hub 70 is mounted on a shaft 72, which may be removably attached to the drive shaft 73 carried in the arm 4 to rotate the drive hub 70. A drive belt 74 extends around the drive hub and the drive end of the roller 62 to cause the drive roller to rotate about shaft 64 when the shaft in the arm 4 is rotated. Thus, when the operator depresses the pedal 22, a motor (not shown) rotates the shaft 73, which in turn rotates the drive hub in the module 6, and the belt 74 rotates the drive roller.

Figure 5:
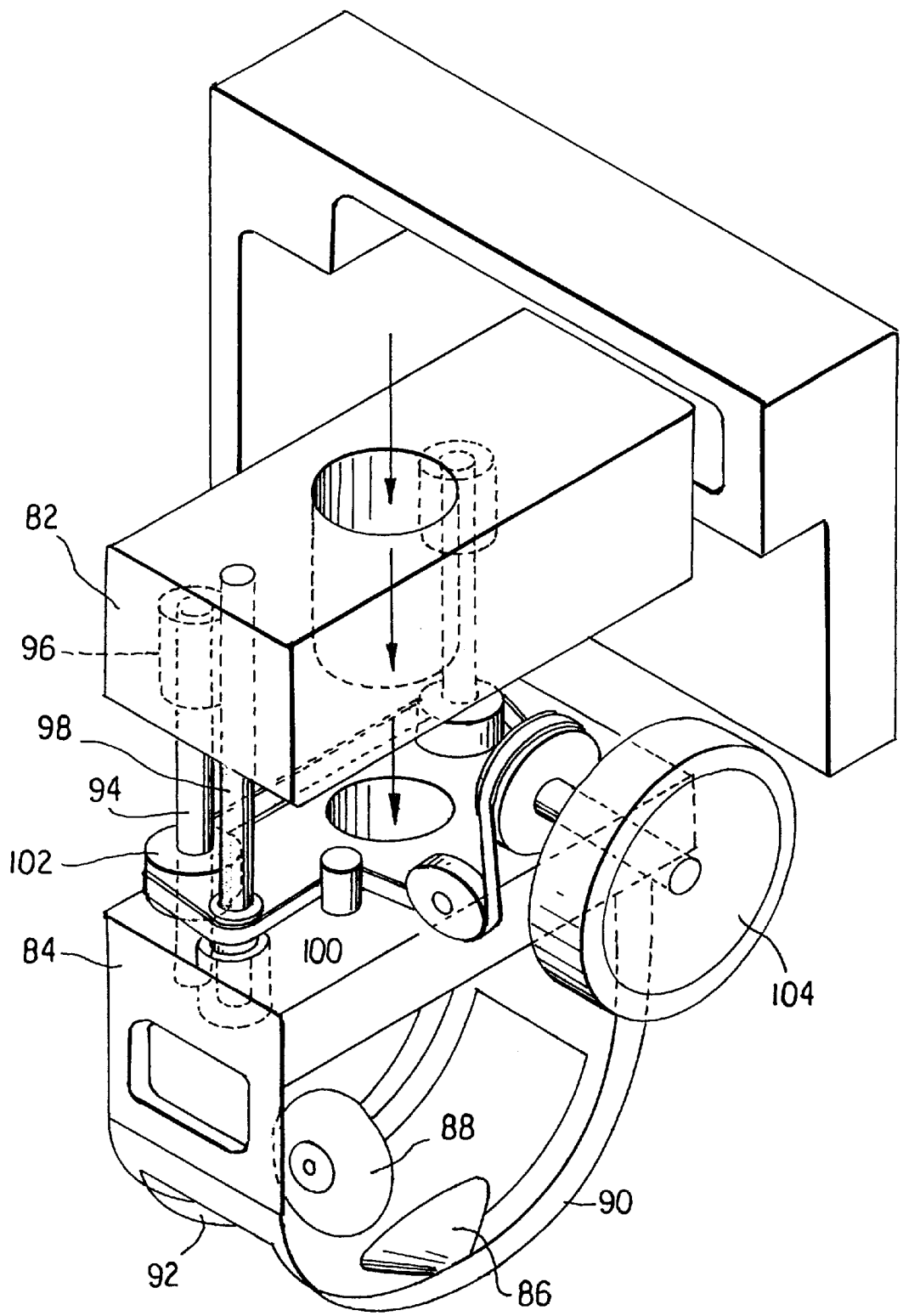
FIG. 5 is a perspective of a nozzle height adjust mechanism of the machine of FIG. 1.

The drive belt is guided in its path by a first roller 76, which is carried on a vertical shaft 78. A second roller 80 guides the lower part of the drive belt, and this roller is also mounted to the shaft 78. It will be appreciated that the rollers 76 and 80 rotate in opposite directions and, thus, rotate independently. One side of the belt will be in tension, and the other will be slack, depending on the direction of rotation of the drive roller 64. Preferably, the roller engaging the side of the belt normally in tension is secured to the shaft, and the forces are received by bearings on the opposite ends of the shaft. The other roller, is then allowed to rotate with respect to the shaft itself. FIG. 5 is a perspective view of a nozzle adjust assembly. The nozzle assembly 12 is secured to a mounting block 82, which is in turn secured to the extension 10. Preferably, the block 82 is mounted for gross height adjustment with respect to the arm 4. This adjustment may be accomplished by a pneumatic cylinder controlled by the system microprocessor. For example, when the operator removes all pressure on the foot pedal, the entire nozzle assembly is lifted to allow access to the material being worked on. When the pedal is depressed, the nozzle descends to the desired height above the material. A pinch roller assembly 84 is adjustably mounted on the block 82. The pinch roller assembly includes two pinch rollers 86 and 88, which are mounted on respective brackets 90 and 92 for rotation about respective shafts. These rollers are for engaging the upper surface of the material to be bonded and urging the material against the drive roller 64, whereby rotation of the drive roller causes movement of the material. The pinch rollers are spherical and are slanted with respect to each other such that the axes of rotation of the rollers 86 and 88 intersect. This arrangement allows the nozzle 14 to be placed between the rollers. Thus, the bonding composition is deposited on the material to be bonded at a location between the pinch rollers.

The pinch roller assembly is preferably connected to the mounting block 82 by a series of linear rods 94 each of which is carried in the block 82 in a linear bearing 96. The distance between the pinch roller assembly 84 and the mounting block 82 is adjusted by one or more ball screw assemblies 98. The ball screw assemblies are rotated by a belt 100 that is directed around the ball screw assemblies by pulleys 102. The belt also passes over a drive wheel connected to a nozzle adjust knob 104. When the nozzle adjust knob is rotated, the belt 100 moves and rotates the ball screw assemblies to cause the pinch roller assembly to raise or lower with respect to the mounting block 82. This causes the distance between the rolling surfaces of the pinch rollers, hence the material to be bonded, or increase or decrease. Preferably, the knob 104 includes a detent mechanism that provides the operator with a tactile indication of the distance by which the pinch roller assembly has been moved. For example, each detent may represent an adjustment in height of 0.001 in.

As noted, the machine preferably includes a microprocessor that controls the operation. The operator begins the operation of bonding two pieces of material by manually depressing the foot pedal 22. The microprocessor receives an input from the foot pedal and initiates a series of steps to insure the proper application of the heated composition to the material. First, the power supply for the laser light source is supplied with maximum power. In the preferred embodiment, the laser is a 150 watt laser, and the power supply is provided with the power to produce that power from the laser. After about 02. sec, the shutter is the cavity is opened. After about another 0.2 sec, the power is reduced to a steady state power that is determined by a look up table, which has previously recorded the power requirements for particular flow rates of the material. The particular flow rate and rate of advancement of the material are also determined by the position of the foot pedal.

The shutter is preferably a cylindrical element with a transverse aperture aligned with the laser cavity. When the element is rotated such that the axis of the aperture is transverse to the cavity, lasing is prevented. As the shutter element is rotated, however, the aperture becomes aligned with the cavity, allowing lasing to initiate. This has been found to be efficient because the aperture essentially opens from the center of the laser beam outwardly. The shutter is controlled by a pneumatic mechanism 104 mounted on the side of the laser 8.

For safety, it is preferred that the laser beam is directed through a telescoping element (not shown) connecting the light module to the nozzle module. This allows the distance between these parts to be changed while preventing the escape of dangerous laser light.

Modifications within the scope of the appended claims will be apparent to those of skill in the art.

I claim:

1. Apparatus for securing at least two pieces of material together comprising, drive means for engaging and moving said pieces in a first direction, a nozzle mounted with respect to said drive means for applying a composition for securing said pieces together as said pieces move in said first direction, a light source for illuminating said composition as it passes through said nozzle, manually adjustable means for allowing an operator manually to adjust the rate of movement of said material, and means for coordinating the supply of said composition to said nozzle and the power of said light source with said rate of movement wherein said drive means comprises an arm extending in a first direction, a drive shaft mounted in said arm and extending in said first direction for rotation about an axis parallel to said first direction a drive module removably attached to an end of said arm, said drive module comprising means for engaging said drive shaft, a drive roller for engaging said material and means for connecting said means said means for engaging said drive shaft to said drive roller for rotating said drive roller.

2. Apparatus according to claim 1 wherein said composition is heat meltable.

3. Apparatus according to claim 1 further comprising means for adjusting the distance between an outlet of said nozzle and said drive roller.

4. Apparatus according to claim 3 further comprising first and second pinch rollers for engaging said pieces of material and urging said material against said drive roller.

5. Apparatus according to claim 4 wherein said first and second pinch rollers are on respective opposite sides of said nozzle.

6. Apparatus according to claim 5 wherein said first and second pinch rollers are mounted for rotation about intersecting axes.

7. Apparatus for moving flexible material comprising an elongate arm extending in a first direction for supporting said material, a drive shaft mounted in said arm and extending in said first direction for rotation about an axis parallel to said first direction, a drive module removably attached to an end of said arm, said drive module comprising means for engaging said drive shaft, a drive roller for engaging and moving said material and means for connecting said means for engaging said drive shaft to said drive roller for rotating said drive roller upon rotation of said drive shaft.

8. A drive module comprising a module housing, means carried by said housing for removable engagement of a drive shaft rotatable about a first axis, a drive roller attached to said housing for engaging material to be moved and for rotation with respect to said housing about a second axis transverse to said first axis, and means for connecting said means for removable engagement to said drive roller for causing said drive roller to rotate upon rotation of said drive shaft.

\* \* \* \* \*